United States Patent [19]

Kirchler

[11] Patent Number: 4,816,190
[45] Date of Patent: Mar. 28, 1989

[54] APPARATUS FOR PRODUCING WHIPPED CREAM

[76] Inventor: Manfred Kirchler, Mutterstrasse 5, A-6800 Feldkirch, Fed. Rep. of Germany

[21] Appl. No.: 179,567

[22] Filed: Apr. 8, 1988

[30] Foreign Application Priority Data

Apr. 15, 1987 [AT] Austria ................................ 956/87

[51] Int. Cl.$^4$ ............................ B01F 3/04; B01F 5/08
[52] U.S. Cl. ......................................... 261/37; 99/452; 261/DIG. 16; 426/474; 426/519
[58] Field of Search ........ 261/37, 27, 140.1, DIG. 16, 261/DIG. 26; 426/474, 519; 99/452, 460; 366/101, 604; 222/190, 318, 372, 378, 631; 141/67, 70

[56] References Cited

U.S. PATENT DOCUMENTS

| | | | |
|---|---|---|---|
| 2,576,947 | 12/1951 | Larson | 261/DIG. 16 |
| 2,919,726 | 1/1960 | Zimmermann et al. | 261/DIG. 16 |
| 2,967,700 | 1/1961 | Lee et al. | 261/37 X |
| 3,168,217 | 2/1965 | Nilsen et al. | 426/474 X |
| 3,606,266 | 9/1971 | MacManus | 261/DIG. 16 |
| 3,700,214 | 10/1972 | MacManus | 261/140.1 X |
| 3,713,841 | 1/1973 | MacManus | 426/474 |
| 3,758,080 | 9/1973 | MacManus | 261/DIG. 16 |
| 4,144,293 | 3/1979 | Hamoto et al. | 426/519 X |
| 4,457,876 | 7/1984 | Brand | 99/460 X |

Primary Examiner—Richard L. Chiesa
Attorney, Agent, or Firm—Toren, McGeady & Associates

[57] ABSTRACT

An apparatus for producing whipped cream includes a pressureless reservoir for receiving the cream, a pump driven by means of a motor, an intake line connecting the pressureless reservoir to the pump, and a pressure line leading from the pump to a homogenizer including an outlet nozzle. The intake line is connected to an air intake duct and operation of the motor is started by means of the switch. A relieving line leading to the reservoir is connected to the pressure line. A valve is provided in the relieving line. The valve is in operative connection with the switch in such a way that the valve is closed when the pump is running and the valve is open when the pump is stopped.

7 Claims, 1 Drawing Sheet

U.S. Patent   Mar. 28, 1989   4,816,190
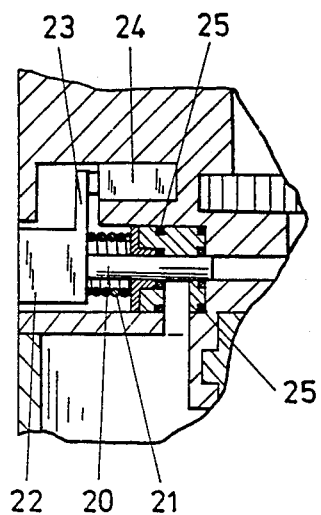
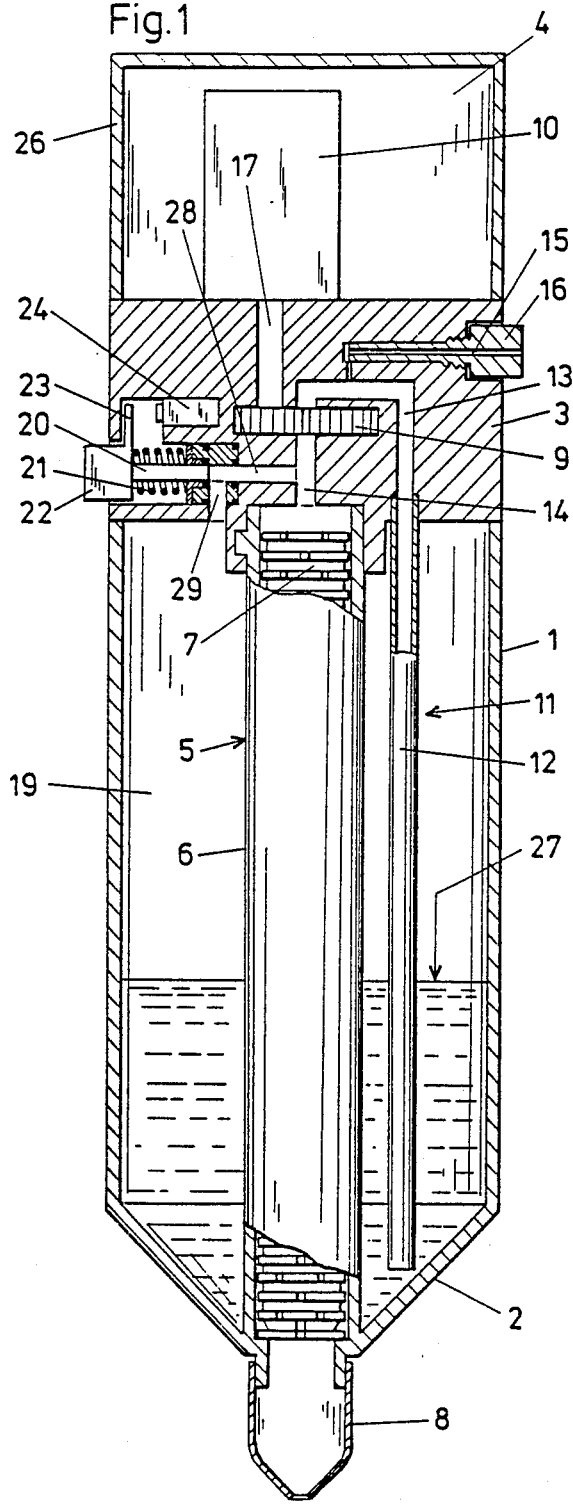

APPARATUS FOR PRODUCING WHIPPED CREAM

BACKGROUND OF THE INVENTION

1. Field of the Invention

The present invention relates to an apparatus for producing whipped cream. The apparatus includes a pressureless reservoir for receiving the cream, a pump, particularly a gear pump, driven by means of a motor, an intake line connecting the pressureless reservoir to the pump, and a pressure line leading from the pump to a homogenizer including an outlet nozzle, wherein the intake line is connected to an air intake duct and operation of the motor can be started by means of a switch.

2. Description of the Prior Art

Apparatus of the above-described type have a valve either upstream or downstream of the homogenizer, as seen in flow direction of the cream. Because of the presence of the valve, a check valve must be provided in the intake line between the air intake duct and the pump, so that the intake line can be kept pressure free after the motor for driving the pump has been switched off. If this check valve were not provided, the danger would exist that cream flows back into the air intake duct which, in turn, would lead to problems in the operation of the apparatus.

The above-described valves are provided downstream of the homogenizer and immediately upstream of the outlet nozzle. As a rule, the valves are spring-biased ball valves. Since these valves open quickly as soon as the holding force of the spring has been exceeded by the pressure, it is not possible to control the discharged amount of cream by means of such devices. In addition, the passage of the ball valves is a relatively narrow annular gap whose size is in the order of magnitude of the gaps and passages of the homogenizer. If the whipped cream leaving the homogenizer is again forced through such an annular gap, the danger exists that the whipped cream is decomposed into its components, i.e., cream and air.

It is, therefore, the primary object of the present invention to provide an apparatus for the production of whipped cream in which the above-described disadvantages are avoided.

SUMMARY OF THE INVENTION

In accordance with the present invention, a relieving or discharge line leading to the reservoir is connected to the pressure line and a valve is provided in the relieving line, wherein the valve is in operative connection with the switch in such a way that the valve is closed when the pump is running and the valve is open when the pump is stopped.

The apparatus according to the present invention provides the advantage that as soon as the pump is switched off, the pressure line is in communication through the relieving line with the pressureless reservoir and, thus, the pressure in this section is removed, so that the cream cannot be forced back through the pump in the air intake duct.

The various features of novelty which characterize the invention are pointed out with particularity in the claims annexed to and forming a part of this disclosure. For a better understanding of the invention, its operating advantages and specific objects attained by its use, reference should be had to the drawings and descriptive matter in which there is illustrated and described a preferred embodiment of the invention.

BRIEF DESCRIPTION OF THE DRAWING

In the drawing:

FIG. 1 is a longitudinal view of an apparatus according to the present invention; and FIG. 2 shows a detail on a larger scale of the apparatus of FIG. 1.

DETAILED DESCRIPTION OF THE INVENTION

The apparatus for producing whipped cream shown in FIG. 1 is a hand-held apparatus and includes a cylindrical container 1 having a vertically extending axis. The bottom of the container 1 is formed by a downwardly projecting conical portion 2. An upper portion 3 of the cylindrical container 1 includes the components which are essential for the operation of the apparatus and which will be described in detail below.

A chamber 4 is formed above upper portion 3. Chamber 4 is defined by a housing 26. In the middle of the cylindrical container 1 is provided a homogenizer 5 which includes an outer tube 6 and a mixing insert tube 7. Such homogenizers are known in the art. The homogenizer 5 ends in an outlet nozzle 8.

A small gear pump 9 is provided in upper portion 3. Gear pump 9 is driven by a motor 10 through a shaft 17. Motor 10 is arranged in chamber 4. An accumulator for the operation of motor 10 may also be provided in chamber 4.

An intake line 11 leads to pump 9 from a pressureless reservoir 19 formed in cylindrical container 1. A first part of this intake line 11 is formed by a tube or hose 12 and the other part of the intake line 11 is formed by a bore 13 defined in portion 3. A pressure line 14 in the form of a bore in portion 3 leads pump 9 directly to the homogenizer 5. In the region upstream of pump 9, the bore 13 which forms part of the intake line 11 is connected to an air intake duct 15 which leads to the outside. In the illustrated embodiment, air intake duct 15 leads to a screw-in nozzle 16.

Pressure line 14 is provided in the middle of the upper portion 3. A relieving line formed in upper portion 3 has a radially extending section 28 which is in communication with pressure line 14 and an axially extending section 29 which is in communication with reservoir 19. Thus, section 28 of the relieving line extends at a right angle to the axis of the cylindrical container 1 and radially relative to the cylinder.

A valve shaft 20 is guided in the radially extending section 28 of the relieving line. The valve shaft 20 also extends axially through a helical spring 21. The valve shaft 20 is at its outer end fixedly connected to an actuating button 22. The spring 21 rests with its end against the inner side of actuating button 22. Actuating button 22 additionally has a laterally protruding projection 23. A microswitch 24 is provided in the sliding range of the actuating knob 22. When microswitch 24 is actuated, motor 10 and, thus, pump 9 are switched on.

Section 29 of the relieving line which is in communication with the reservoir 19 is located in that portion of the section 28 of the relieving line through which the valve shaft 20 travels when the knob 22 is actuated, so that the valve shaft 20 opens or closes the relieving line composed of sections 28 and 29 depending upon the position of the actuating knob 22. FIG. 1 shows the relieving line in the open position, while FIG. 2 shows the relieving line in the closed position. Small O-rings which interact with the valve shaft 20 are provided as sealing members in the part of the section 28 of the relieving line along which the valve shaft 20 travels.

Container 1 as well as housing 26 defining chamber 4 may be connected to portions 3 through a threaded connection or a bayonet-type connection.

FIG. 1 of the drawing shows the apparatus according to the present invention ready for operation. Cream 27 is filled into container 1. The apparatus is hand-held and, if the apparatus is not needed, it is stored in an upright position in a suitable holder. In the holder, the accumulators in chamber 4 may be charged. It is also advantageous to construct the holder in such a way that the cream in container 1 is kept cool.

When whipped cream is to be produced, the apparatus is removed from the holder, not shown in the drawings, and the actuating knob 22 is pressed. As a result, motor 10 and, thus, pump 9 are switched on through switch 24. Simultaneously, the actuation of the knob 22 causes the valve shaft 20 to be inserted into the section 28 of the relieving line, as shown in FIG. 2, and, thus, the passage to the section 29 of the relieving line is blocked. Cream is now taken in through intake line 11 and air is taken in through air intake duct 15. The mixture composed of cream and air is now forced by pump 9 through pump 9 and through pressure line 14 into and through the homogenizer 5, so that whipped cream is produced in the known manner. The whipped cream is discharged through the outlet nozzle 8.

After the desired amount of whipped cream has been produced in this manner, the actuating knob 22 is released. The knob 22 is returned into its original position illustrated in FIG. 1 by the force of spring 21. Consequently, motor 10 is switched off and pump 9 stops and, simultaneously, the pressure line 14 is connected through section 28 and 29 of the relieving line to the pressureless reservoir 19, so that the pressure in line 14 collapses when motor 10 is switched off. As a result, it is safely avoided that a portion of the whipped cream is forced back through the pump. Accordingly, whipped cream cannot reach the air intake duct 15. Nevertheless, the air intake duct 15 is constructed in the form of a screw-in nozzle 16, so that the nozzle and, thus, the entire duct can be disassembled and cleaned. This measure is provided because the air intake duct 15 has a very small diameter which, for this reason, is particularly susceptible to clogging.

Instead of an off-on switch 24, it is also possible to use a regulator which regulates the rate of rotation of motor 10 in dependence upon its position. In other words, the more the actuating knob 22 is pressed in, the faster the motor 10 operates the pump 9, so that the amount of whipped cream produced and discharged can be finely controlled.

In the illustrated embodiment, sections 28 and 29 of the relieving line together with the valve shaft 20 form a simple angle valve. It is basically possible to use other valves, for example, a small solenoid valve could be provided, wherein the exciting winding of the solenoid valve is switched parallel to the winding of the motor 10.

Instead of the direct connection between the valve shaft 20 and the actuating knob 22, a small lever mechanism could be provided for translating the distance traveled by the actuating knob 22. As shown in the drawing, the actuating knob 22 is moved radially. It is within the scope of the present invention to provide a pivotable actuating lever instead of the radially movable actuating knob.

The apparatus according to the present invention described above is a hand-held apparatus. However, it is also possible and within the scope of the present invention to mount the apparatus according to the invention in a stationary unit. Also, while it has been described above that motor 10 is driven by rechargeable accumulators, it would also be conceivable to equip the apparatus according to the present invention with a direct main supply. Moreover, instead of gear pump 9, a different type of compressor may be used, for example, a piston pump.

While a specific embodiment of the invention has been shown and described in detail to illustrate the application of the inventive principles, it will be understood that the invention may be embodied otherwise without departing from such principles.

I claim:

1. In an apparatus for producing whipped cream including a pressureless reservoir for receiving the cream, a pump driven by a motor, an intake line connecting the pressureless reservoir to the pump, and a pressure line leading from the pump to a homogenizer including an outlet nozzle, wherein the intake line is connected to an air intake duct, and a switch for starting operation of the motor, the improvement comprises a relieving line leading to the reservoir, the relieving line being connected to the pressure line, a valve provided in the relieving line, and means for operatively connecting the valve to the switch, so that the valve is closed when the pump is running and the valve is open when the pump is stopped.

2. The apparatus according to claim 1, wherein the switch includes an actuating member movable in a sliding direction, the relieving line including at least one first section extending parallel to the sliding direction of the actuating member, the actuating member having a valve shaft which extends into the first section of the relieving line, the relieving line having a second section in communication with the reservoir, the second section being connected to the first section at a portion of the first section along which the valve shaft travels when the switch is actuated.

3. The apparatus according to claim 2, wherein the homogenizer has an axis, the first section of the relieving line extending perpendicularly relative to the axis of the homogenizer.

4. The apparatus according to claim 2, wherein the actuating member of the switch is a button which is movable against the force of a spring along a sliding path, a switching lever of a microswitch being located in the sliding path of the button.

5. The apparatus according to claim 4, wherein the spring is a helical spring, the valve shaft extending axially through the helical spring.

6. The apparatus according to claim 1, wherein the reservoir is a cylinder having a vertical axis, a top and a bottom, wherein the bottom of the cylinder is formed by a downwardly projecting cone, and the top of the cylinder being closed off by an upper portion, a part of the intake line, the pressure line, the air intake duct, and the first and second sections of the relieving line being formed by bores in the upper portion, the pump and the switch being mounted in the upper portion, and wherein the axis of the cylinder and the axis of the homogenizer coincide.

7. The apparatus according to claim 6, wherein a housing defining a chamber is arranged above the upper portion, the motor for the pump and an accumulator for operating the motor being mounted in the chamber.

* * * * *